(12) United States Patent
Xue et al.

(10) Patent No.: US 7,929,258 B2
(45) Date of Patent: Apr. 19, 2011

(54) MAGNETIC SENSOR INCLUDING A FREE LAYER HAVING PERPENDICULAR TO THE PLANE ANISOTROPY

(75) Inventors: Song S. Xue, Edina, MN (US); Zheng Gao, Savage, MN (US); Shaoping Li, Fremont, CA (US); Kaizhong Gao, Eden Prairie, MN (US); Dimitar V. Dimitrov, Edina, MN (US); Konstantin Nikolaev, Edina, MN (US); Patrick J. Ryan, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 728 days.

(21) Appl. No.: 12/017,822

(22) Filed: Jan. 22, 2008

(65) Prior Publication Data

US 2009/0185315 A1     Jul. 23, 2009

(51) Int. Cl.
    *G11B 5/33* (2006.01)
(52) U.S. Cl. .................................................. 360/324.12
(58) Field of Classification Search .............. 360/324.1, 360/324.11, 324.12
    See application file for complete search history.

(56) References Cited

U.S. PATENT DOCUMENTS

| | | | |
|---|---|---|---|
| 6,219,275 B1* | 4/2001 | Nishimura | 365/173 |
| 6,577,124 B2* | 6/2003 | Coehoorn et al. | 324/252 |
| 6,650,513 B2* | 11/2003 | Fullerton et al. | 360/324.2 |
| 6,967,863 B2* | 11/2005 | Huai | 365/158 |
| 6,992,359 B2 | 1/2006 | Nguyen et al. | |
| 7,602,591 B2* | 10/2009 | Sbiaa et al. | 360/324.12 |
| 7,813,202 B2* | 10/2010 | Rodmacq et al. | 365/209 |
| 2002/0167059 A1* | 11/2002 | Nishimura et al. | 257/421 |

* cited by examiner

*Primary Examiner* — Angel A. Castro
(74) *Attorney, Agent, or Firm* — Kinney & Lange, P.A.

(57) ABSTRACT

A magnetic sensor includes a reference layer having a first magnetization direction and a free layer assembly having an effective magnetization direction substantially perpendicular to the first magnetization direction and substantially perpendicular to a plane of each layer of the free layer assembly. A spacer layer is between the reference layer and the free layer, and a signal enhancement layer is exchange coupled to the free layer assembly on a side opposite the spacer layer.

20 Claims, 3 Drawing Sheets

MAGNETIC SENSOR INCLUDING A FREE LAYER HAVING PERPENDICULAR TO THE PLANE ANISOTROPY

BACKGROUND

In an electronic data storage and retrieval system, a magnetic recording head typically includes a reader portion having a sensor for retrieving magnetically encoded information stored on a magnetic medium. Magnetic flux from the surface of the medium causes rotation of the magnetization vector of a sensing layer or layers of the sensor, which in turn causes a change in the electrical properties of the sensor. The sensing layers are often called free layers, since the magnetization vectors of the sensing layers are free to rotate in response to external magnetic flux. The change in the electrical properties of the sensor may be detected by passing a current through the sensor and measuring a voltage across the sensor. Depending on the geometry of the device, the sense current may be passed in the plane (CIP) of the layers of the device or perpendicular to the plane (CPP) of the layers of the device. External circuitry then converts the voltage information into an appropriate format and manipulates that information as necessary to recover information encoded on the disc.

A structure in contemporary read heads is a thin film multilayer structure containing ferromagnetic material that exhibits some type of magnetoresistance. A typical magnetoresistive sensor configuration includes a multilayered structure formed of a nonmagnetic layer (such as a thin insulating barrier layer or a nonmagnetic metal) positioned between a synthetic antiferromagnet (SAF) and a ferromagnetic free layer, or between two ferromagnetic free layers. The resistance of the magnetic sensor depends on the relative orientations of the magnetization of the magnetic layers.

With increased recording densities, the dimensions of the magnetic sensor are decreased to sense the magnetic flux of each bit on the magnetic medium. A consequence of decreasing the size of the magnetic sensor is preserving the magnetization of the in-plane anisotropy of the magnetic layers of the magnetic sensor. For example, at smaller dimensions, the magnetization of a portion of the free layer may cant away from the anisotropic magnetization direction to minimize magnetostatic energy. The relative fraction of the region with canted magnetization may increase as the dimensions continue to decrease. In addition, changes in the canting direction caused by thermal variations or external fields may increase noise and instability in the sensor. Furthermore, when a permanent magnet is employed to bias magnetic layers in the magnetic sensor, the magnetization direction of the reference layer may be tilted off-axis, thereby reducing the signal generated by the magnetic sensor.

SUMMARY

The present invention relates to a magnetic sensor including a reference layer having a first magnetization direction and a free layer assembly having an effective magnetization direction substantially perpendicular to the first magnetization direction and substantially perpendicular to a plane of each layer of the free layer assembly. A spacer layer is between the reference layer and the free layer, and a signal enhancement layer is exchange coupled to the free layer assembly on a side opposite the spacer layer.

DETAILED DESCRIPTION

Figure 1:
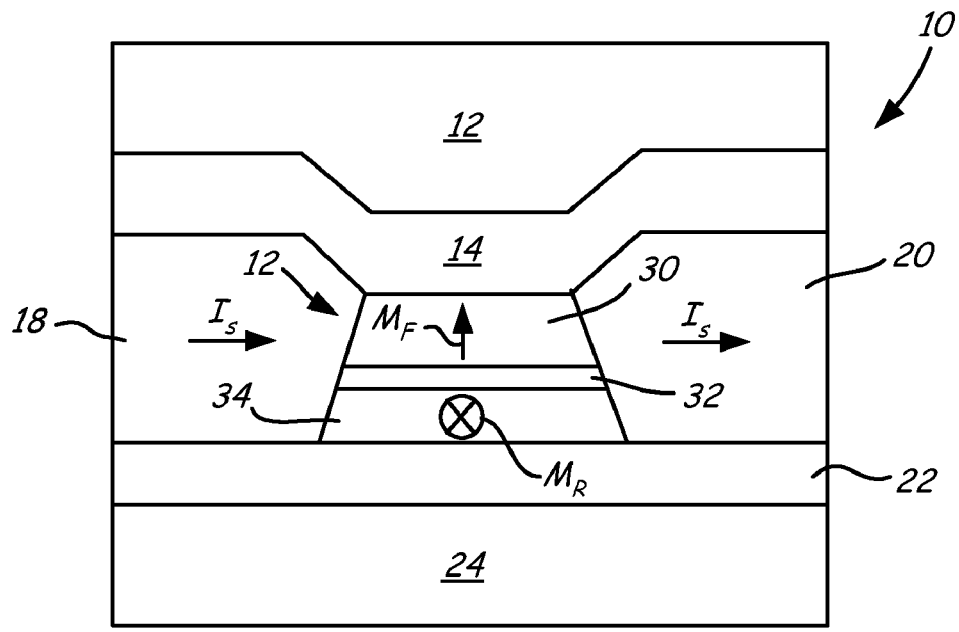
FIG. 1 is a front surface view of a current-in-plane (CIP) magnetic sensor including a free layer assembly having a perpendicular to the plane anisotropy.

FIG. 1 is a front surface view of current-in-plane (CIP) magnetic sensor 10 including sensor stack 12, first shield 14, first gap layer 16, first lead 18, second lead 20, second gap layer 22, and second shield 24. Sensor stack 12 includes free layer assembly 30, spacer layer 32, and reference layer assembly 34. In the embodiment shown, free layer assembly 30 is on the top of sensor stack 12 and reference layer assembly 34 is on the bottom of sensor stack 12. It will be appreciated that sensor stack 12 may alternatively be configured with reference layer assembly 34 on the top of sensor stack 12 and free layer assembly 30 on the bottom of sensor stack 12.

Free layer assembly 30 is a single or multiple layer structure having a magnetization $M_F$ that rotates in response to an external magnetic field, such as localized magnetic fields from a magnetic medium. Magnetization $M_F$ is a function of the magnetizations of all layers of free layer assembly 30. Free layer assembly 30 has an effective or net direction that is perpendicular to the plane of each layer of free layer assembly 30 in a quiescent state (i.e., when no external field is applied to sensor stack 12 or when the net magnetic field exerted on sensor stack 12 is zero), as shown in FIG. 1. Magnetization $M_F$ of free layer assembly 30 in a quiescent state is due to the perpendicular anisotropy of the layer or layers of free layer assembly 30. While the direction of magnetization $M_F$ in a quiescent state is shown directed toward the top of sensor stack 12, the layer or layers of free layer assembly 30 may alternatively have effective magnetization direction that is directed toward the bottom of sensor stack 12 in a quiescent state. When free layer assembly 30 has perpendicular-to-the-plane anisotropy, canting of the magnetization proximate the edges of the layer or layers of free layer assembly 30 is prevented. This reduces noise in sensor stack 12, thereby improving the signal generated, and improves the stability of sensor stack 12.

Spacer layer 32 is a nonmagnetic layer disposed between free layer assembly 30 and reference layer assembly 34. In some embodiments, spacer layer 32 is a nonmagnetic, conductive material, such as Cu, Ag, Au, or Ru, making magnetic sensor 10 a giant magnetoresistive sensor. In other embodiments, spacer layer 32 is a non-magnetic, insulative or semiconductive material, such as oxides formed of Mg, Al, Hf, or Ti, making magnetic sensor 10 a tunneling magnetoresistive sensor.

Reference layer assembly 34 has a fixed magnetization direction $M_R$ that is in-plane with the layer or layers of reference layer assembly 34. Magnetization direction $M_F$ of free layer assembly 30 is perpendicular to fixed magnetization direction $M_R$ in a quiescent state. Reference layer assembly 34 may be a single ferromagnetic layer having an anisotropically defined magnetization direction. Reference layer assembly 34 may also include various combinations of layers to provide magnetization $M_R$ having a fixed direction, such as a ferromagnetic pinned layer with an antiferromagnetic pinning layer, a synthetic ferromagnetic pinned layer (i.e., two ferromagnetic layers coupled by a nonmagnetic metal, such as Ru), or a synthetic ferromagnetic pinned layer coupled to an antiferromagnetic pinning layer. Ferromagnetic layers of reference layer assembly 34 may be made of a ferromagnetic alloy, such as CoFe, NiFe, or NiFeCo, and the antiferromagnetic layer may be made of PtMn, IrMn, NiMn, or FeMn. In an alternative embodiment, reference layer assembly 34 is replaced by a second free layer assembly having perpendicular-to-the-plane anisotropy.

In operation, sense current $I_S$ is passed through sensor stack 12 via leads 18 and 20 such that the current passes in the plane of the layer or layers of sensor stack 12. Sense current $I_S$ may be a direct current (DC) bias current, an alternating current (AC) bias current, or a current with a combination of DC and AC bias components. As magnetization $M_F$ rotates in response to external magnetic fields, the resistance of sensor stack 12 changes as a function of the angle between magnetizations $M_F$ and $M_R$. The voltage across sensor stack 12 is measured between leads 18 and 20 by external circuitry (not shown) to detect changes in resistance of sensor stack 12.

Figure 2:
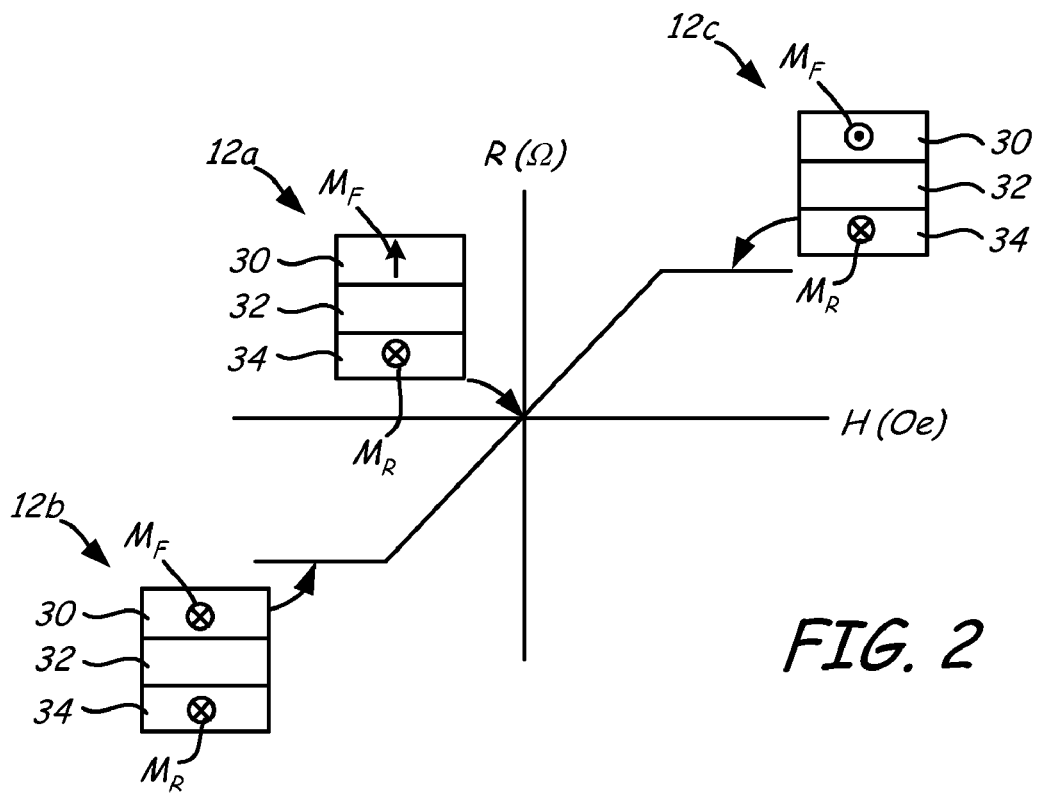
FIG. 2 is a graph showing the resistance across the magnetic sensor as a function of the magnetic state of the free layer assembly.

FIG. 2 is a graph showing the resistance across sensor stack 12 as a function of the direction of magnetization $M_F$ induced by an external magnetic field. Layer diagrams 12a, 12b, and 12c illustrate the various magnetic states of sensor stack 12 as viewed from the front surface. Layer diagram 12a illustrates the states of magnetization $M_F$ and magnetization $M_R$ in a quiescent state (i.e., no external magnetic field), in which magnetization $M_F$ is perpendicular to the plane of free layer assembly 30. In this state, the readback voltage across sensor stack 12 is approximately zero.

Layer diagram 12b illustrates the states of magnetization $M_F$ and magnetization $M_R$ when sensor stack 12 is in the presence of an external magnetic field having a first direction. The external magnetic field causes magnetization $M_F$ to rotate such that magnetization $M_F$ is parallel with magnetization $M_R$. In this state, the voltage drop across sensor stack 12 is negative when sense current $I_S$ is applied, which is plotted below the zero resistance line in FIG. 2.

Layer diagram 12c illustrates the states of magnetization $M_F$ and magnetization $M_R$ when sensor stack 12 is in the presence of an external magnetic field having a second direction opposite the first direction. The external magnetic field causes magnetization $M_F$ to rotate such that magnetization $M_F$ is anti-parallel with magnetization $M_R$. In this state, the voltage drop across sensor stack 12 is positive when sense current $I_S$ is applied, which is plotted above the zero resistance line in FIG. 2.

Figure 3:
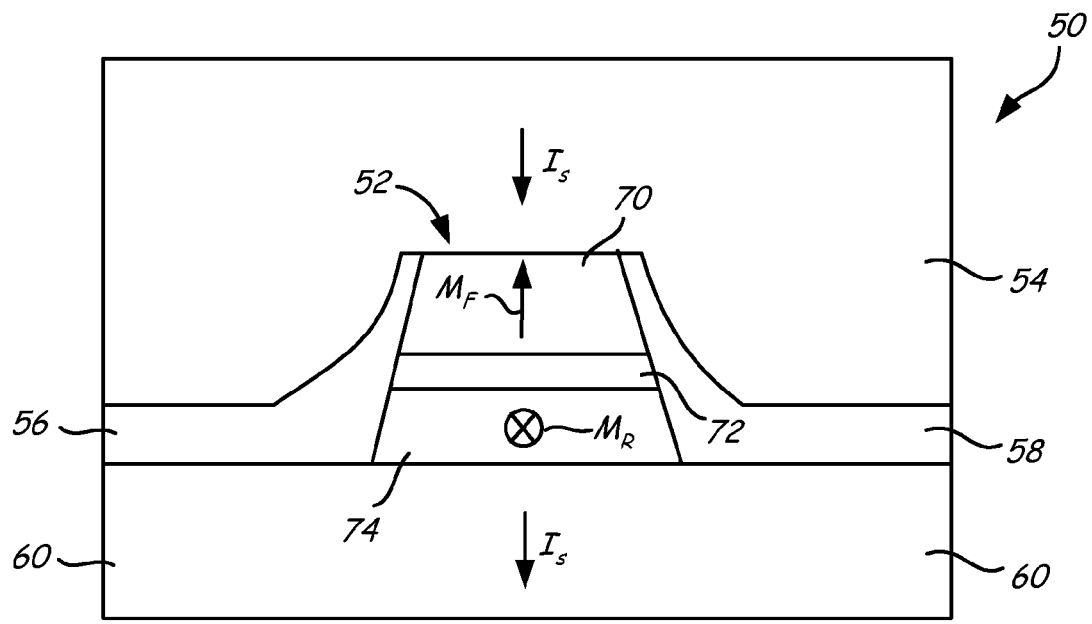
FIG. 3 is a front surface view of a current perpendicular to the plane (CPP) magnetic sensor including a free layer assembly having a perpendicular to the plane anisotropy.

FIG. 3 is a front surface view of a current perpendicular to the plane (CPP) magnetic sensor 50 including sensor stack 52, first shield/lead 54, first insulating layer 56, second insulating layer 58, and second shield/lead 60. Sensor stack 52 includes free layer assembly 70, spacer layer 72, and reference layer assembly 74. In the embodiment shown, free layer assembly 70 is on the top of sensor stack 52 and reference layer assembly 74 is on the bottom of sensor stack 52. It will be appreciated that sensor stack 52 may alternatively include reference layer assembly 74 on the top of sensor stack 42 and free layer assembly 70 on the bottom of sensor stack 52.

Free layer assembly 70 is a single or multiple layer structure having a magnetization $M_F$ that rotates in response to an external magnetic field. Free layer assembly 70 has a magnetization $M_F$ with an effective direction that is perpendicular to the plane of each layer of free layer assembly 70 in a quiescent state due to the perpendicular anisotropy of the layer or layers of free layer assembly 70. While the direction of magnetization $M_F$ in a quiescent state is shown directed toward the top of sensor stack 52, the layer or layers of free layer assembly 70 may alternatively provide an effective magnetization direction that is directed toward the bottom of sensor stack 52 in a quiescent state.

Spacer layer 72 is a nonmagnetic layer disposed between free layer assembly 70 and reference layer assembly 74. Spacer layer 72 may be made of materials similar to those described with regard to spacer layer 32 (FIG. 1), such that magnetic sensor 50 is a giant magnetoresistive sensor or a tunneling magnetoresistive sensor.

Reference layer assembly 74 has a fixed magnetization direction $M_R$ that is in-plane with the layer or layers of reference layer assembly 74. Magnetization direction $M_F$ of free layer assembly 70 is perpendicular to fixed magnetization direction $M_R$ in a quiescent state. Reference layer assembly 74 may be a single ferromagnetic layer having an anisotropically defined magnetization direction. Reference layer assembly 74 may also include various combinations of layers, such as those described with regard to reference layer assembly 34 above. In an alternative embodiment, reference layer assembly 74 is replaced by a second free layer assembly having perpendicular-to-the-plane anisotropy.

In operation, sense current $I_S$ is passed through sensor stack 12 via leads/shields 54 and 60 such that the sense current $I_S$ passes perpendicular to the plane of the layer or layers of sensor stack 52. As magnetization $M_F$ rotates in response to external magnetic fields, the resistance of sensor stack 12 changes as a function of the angle between magnetizations $M_F$ and $M_R$. The voltage across sensor stack 52 is measured between leads/shields 54 and 60 by external circuitry (not shown) to detect changes in resistance of sensor stack 52. The response of sensor stack 52 to external magnetic fields, and the corresponding changes in resistance across sensor stack 52, is similar to that shown and described with regard to sensor stack 52 in FIG. 2.

Figure 4:
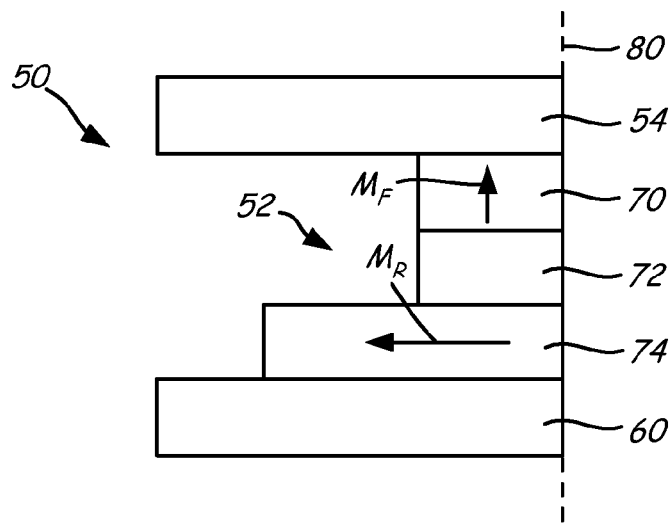
FIG. 4 is a cross-sectional view of a magnetic sensor including an extended reference layer and a free layer assembly having a perpendicular to the plane anisotropy.

FIG. 4 is a cross-sectional view of sensor stack 52 disposed between leads/shields 54 and 60. Leads/shields 54 and 60, free layer assembly 70, spacer layer 72, and reference layer assembly 74 define front surface 80. In some embodiments, front surface 80 is substantially planar. In the embodiment shown, reference layer assembly 74 extends further away from front surface 80 than free layer assembly 70 and spacer layer 72. Consequently, reference layer assembly 74 has much stronger shape anisotropy in the cross-sectional direction than in other directions. In some embodiments, reference layer assembly 74 is at least twice as long as free layer assembly 70. As a result, reference layer assembly 74 has reduced variation in its magnetization angle, which results in a more efficient device. In other embodiments, free layer assembly 70, spacer layer 72, and reference layer assembly 74 extend a substantially equal distance from front surface 80.

Figure 5A:
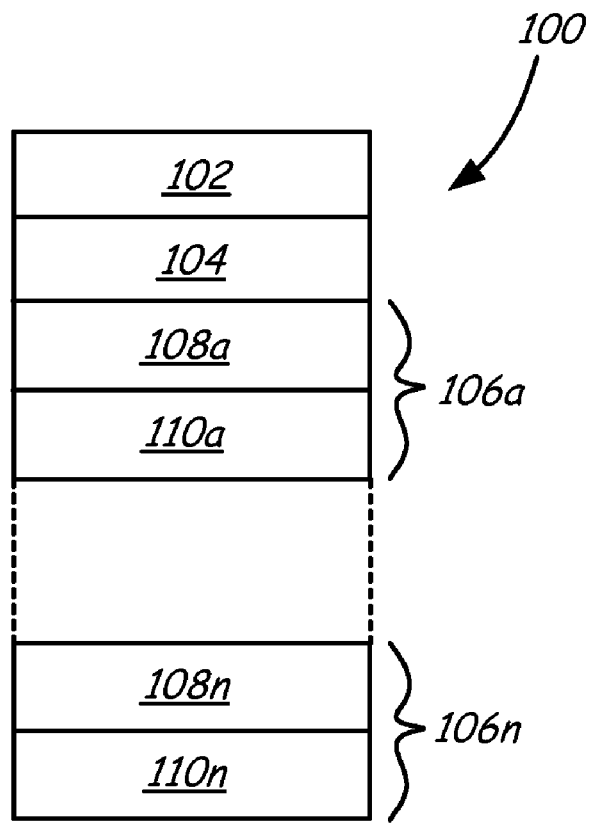
FIG. 5A is a layer diagram of a free layer assembly including a plurality of magnetic bilayers.

FIG. 5A is a layer diagram of free layer assembly 100 that is suitable for use in magnetic sensor 10 as free layer assembly 30 or in magnetic sensor 50 as free layer assembly 70. Free layer assembly 100 includes sense enhancing layer 102, exchange coupling tuning layer 104, and a plurality of bilayers 106a through 106n. Bilayer 106a includes first magnetic layer 108a and second magnetic layer 110a, and bilayer 106n includes first magnetic layer 108n and second magnetic layer 110n. It should be noted that while multiple bilayers are shown, free layer assembly 100 may also include only a single bilayer 106a.

Free layer assembly 100 is designed to assure that the effective anisotropy of the assembly is not too large, which may diminish the output signal of free layer assembly 100 to unacceptably low levels, and not too small, which may cause the magnetization of the magnetic layers to rotate too easily and cause instability. In some embodiments the effective anisotropy is such that the anisotropy field is about 1.0 kOe. In other embodiments, the anisotropy field is greater than about 1.0 kOe. Bilayers 106a-106n may be comprised of any materials or combination of materials that have perpendicular to the plane anisotropy. In some embodiments, bilayers 106a-106n are Co/Pt bilayers, Co/Pd bilayers, Co/Ni bilayers, or Cu/Ni bilayers. Co/Pt and Co/Pd bilayers have a larger perpendicular anisotropy than Co/Ni and Cu/Ni bilayers.

In order to assure free layer assembly 100 provides a sufficient magnetoresistive signal to detect external magnetic fields, signal enhancement layer 102 is exchange coupled to bilayers 106a-106n. In some embodiments, signal enhancement layer 102 is comprised of a soft magnetic material, such as CoFe. Signal enhancement layer 102 may have in-plane anisotropy or perpendicular to the plane anisotropy. In embodiments in which bilayers 106a-106n include Co/Ni or Cu/Ni bilayers, large exchange coupling may be used, since the effective anisotropy of these bilayers is relatively small. Thus, signal enhancement layer 102 may be coupled directly to the stack of bilayers 106a-106n. In embodiments in which bilayers 106a-106n include Co/Pt or Co/Pd bilayers, the anisotropy field is very large, exchange coupling tuning layer 104 may be incorporated into free layer assembly 100 between signal enhancement layer 102 and bilayers 106a-106n. This assures appreciable magnetization rotation in signal enhancement layer 102. The level of coupling between signal enhancement layer 102 and bilayers 106a-106n may be controlled to provide an appropriate signal level by adjusting the thickness and material of exchange coupling tuning layer 104.

Figure 5B:
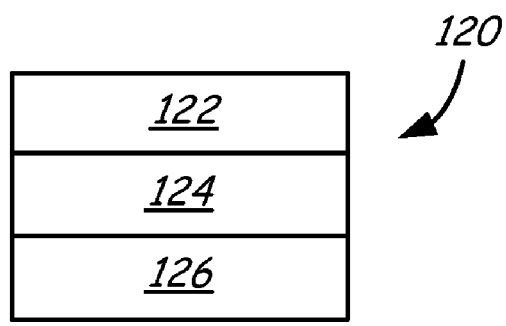
FIG. 5B is a layer diagram of a free layer assembly including a single magnetic layer coupled with a signal enhancement layer.

FIG. 5B is a layer diagram of a free layer assembly 120 that is also suitable for use in magnetic sensor 10 as free layer assembly 30 or in magnetic sensor 50 as free layer assembly 70. Free layer assembly 120 includes sense enhancing layer 122, exchange coupling tuning layer 124, and magnetic layer 126. Magnetic layer 126 may be comprised of any material that has perpendicular to the plane anisotropy. In some embodiments, magnetic layer 126 is comprised of TbFeCoX, where X is a metallic material, such as Al, Y, Nd, Dy, or Sm.

In order to assure free layer assembly 120 provides a sufficient magnetoresistive signal to detect external magnetic fields, signal enhancement layer 122 is exchange coupled to magnetic layer 126. In some embodiments, signal enhancement layer 122 is comprised of a soft magnetic material, such as CoFe. Signal enhancement layer 122 may have in-plane anisotropy or perpendicular to the plane anisotropy. When the anisotropy field from magnetic layer 126 is very large, exchange coupling tuning layer 124 may be incorporated into free layer assembly 120 between signal enhancement layer 122 and magnetic layer 126. This assures appreciable magnetization rotation in signal enhancement layer 122. The level of coupling between signal enhancement layer 122 and magnetic layer 126 may be controlled to provide an appropriate signal level by adjusting the thickness and material of exchange coupling tuning layer 124.

In summary, the present invention relates to a magnetic sensor including a reference layer having a first magnetization direction and a free layer assembly having an effective magnetization direction substantially perpendicular to the first magnetization direction and substantially perpendicular to a plane of each layer of the free layer assembly. A spacer layer is between the reference layer and the free layer, and a signal enhancement layer is exchange coupled to the free layer assembly on a side opposite the spacer layer. When the free layer assembly has a perpendicular to the plane effective anisotropy, canting of the magnetization in the magnetic layers is prevented, even at smaller dimensions. In addition, because permanent magnet biasing is eliminated from the sensor, the magnetization of the reference layer remains on-axis to maximize the magnetoresistive effect in the magnetic sensor.

Although the present invention has been described with reference to preferred embodiments, workers skilled in the art will recognize that changes may be made in form and detail without departing from the spirit and scope of the invention.

The invention claimed is:

1. A magnetic sensor comprising:
   a reference layer having a first magnetization direction;
   a free layer assembly having an effective magnetization direction substantially perpendicular to the first magnetization direction and substantially perpendicular to a plane of each layer of the free layer assembly;
   a spacer layer between the reference layer and the free layer; and
   a signal enhancement layer exchange coupled to the free layer assembly on a side opposite the spacer layer.

2. The magnetic sensor of claim 1, wherein the free layer assembly comprises at least one layer comprised of TbFeCoX, wherein X is selected from the group consisting of Al, Y, Nd, Dy, and Sm.

3. The magnetic sensor of claim 1, wherein the free layer assembly includes a stack of one or more bilayers.

4. The magnetic sensor of claim 3, wherein the one or more bilayers are selected from the group consisting of a Co/Pt bilayer, a Co/Pd bilayer, a Co/Ni bilayer, and a Cu/Ni bilayer.

5. The magnetic sensor of claim 1, wherein the free layer assembly has an effective anisotropic magnetic field of at least about 1.0 kOe.

6. The magnetic sensor of claim 1, wherein the signal enhancement layer comprises CoFe.

7. The magnetic sensor of claim 1, and further comprising:
   an exchange coupling tuning layer between the free layer and the signal enhancement layer.

8. A magnetic sensor comprising:
   a reference layer having a first magnetization direction;
   a free layer assembly having an effective magnetization direction substantially perpendicular to the first magnetization direction and substantially perpendicular to a plane of each layer of the free layer assembly; and
   a spacer layer between the reference layer and the free layer,
   wherein the reference layer, free layer assembly, and spacer layer define a substantially planar surface, and wherein the reference layer extends away from the substantially planar surface further than any layer of the free layer assembly.

9. The magnetic sensor of claim 8, wherein the free layer assembly comprises at least one layer comprised of TbFeCoX, wherein X is selected from the group consisting of Al, Y, Nd, Dy, and Sm.

10. The magnetic sensor of claim 8, wherein the free layer assembly includes a stack of one or more bilayers.

11. The magnetic sensor of claim 10, wherein the one or more bilayers are selected from the group consisting of a Co/Pt bilayer, a Co/Pd bilayer, a Co/Ni bilayer, and a Cu/Ni bilayer.

12. The magnetic sensor of claim 8, wherein the free layer assembly has an effective anisotropic magnetic field of at least about 1.0 kOe.

13. The magnetic sensor of claim 8, and further comprising:
   a signal enhancement layer exchange coupled to the free layer assembly on a side opposite the spacer layer.

14. The magnetic sensor of claim 13, wherein the signal enhancement layer comprises CoFe.

15. The magnetic sensor of claim 13, and further comprising:
   an exchange coupling tuning layer between the free layer and the signal enhancement layer.

16. A magnetic sensor comprising:
   a reference layer having a first magnetization direction;
   a free layer assembly having an effective magnetization direction substantially perpendicular to the first magnetization direction and substantially perpendicular to a plane of each layer of the free layer assembly;
   a spacer layer between the reference layer and the free layer; and
   a signal enhancement layer exchange coupled to the free layer assembly on a side opposite the spacer layer,
   wherein the reference layer, free layer assembly, and spacer layer each have a first side that together define a substantially planar surface, wherein the reference layer, free layer assembly, and spacer layer each have a second side opposite the first side, and wherein the second side of the reference layer is at least as far from the substantially planar surface than the second side of the free layer assembly.

17. The magnetic sensor of claim 16, wherein the free layer assembly comprises at least one layer comprised of TbFeCoX, wherein X is selected from the group consisting of Al, Y, Nd, Dy, and Sm.

18. The magnetic sensor of claim 16, wherein the free layer assembly includes a stack of one or more bilayers.

19. The magnetic sensor of claim 18, wherein the one or more bilayers are selected from the group consisting of a Co/Pt bilayer, a Co/Pd bilayer, a Co/Ni bilayer, and a Cu/Ni bilayer.

20. The magnetic sensor of claim 16, and further comprising:
   an exchange coupling tuning layer between the free layer and the signal enhancement layer.

* * * * *